US010459915B2

(12) United States Patent
Stanfill et al.

(10) Patent No.: US 10,459,915 B2
(45) Date of Patent: Oct. 29, 2019

(54) MANAGING QUERIES

(75) Inventors: Craig W. Stanfill, Lincoln, MA (US);
John Maclean, Elderslie (GB)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 12/977,594

(22) Filed: Dec. 23, 2010

(65) Prior Publication Data
US 2011/0153662 A1    Jun. 23, 2011

Related U.S. Application Data

(60) Provisional application No. 61/289,778, filed on Dec. 23, 2009.

(51) Int. Cl.
G06F 16/30    (2019.01)
G06F 16/2453    (2019.01)

(52) U.S. Cl.
CPC ............. G06F 16/24532 (2019.01)

(58) Field of Classification Search
CPC .................................. G06F 17/30445
USPC ........................................... 707/774
See application file for complete search history.

(56) References Cited

U.S. PATENT DOCUMENTS

| | | | |
|---|---|---|---|
| 7,472,112 B2 | 12/2008 | Pfleiger et al. | |
| 2002/0128897 A1* | 9/2002 | Nelson | G06F 17/30516 707/713 |
| 2002/0141561 A1* | 10/2002 | Duncan et al. | 379/220.01 |
| 2003/0126114 A1* | 7/2003 | Tedesco | G06F 17/30427 |
| 2004/0003004 A1* | 1/2004 | Chaudhuri | G06F 17/30312 |
| 2004/0172385 A1 | 9/2004 | Dayal | |
| 2007/0294214 A1* | 12/2007 | Santosuosso | 707/2 |
| 2008/0033920 A1 | 2/2008 | Colclasure et al. | |
| 2008/0059405 A1 | 3/2008 | Barsness et al. | |
| 2008/0104149 A1 | 5/2008 | Vishniac et al. | |
| 2008/0133608 A1* | 6/2008 | Brown et al. | 707/200 |

(Continued)

FOREIGN PATENT DOCUMENTS

| | | |
|---|---|---|
| JP | 08-314965 | 11/1996 |
| JP | 2006-260511 | 9/2006 |

OTHER PUBLICATIONS

International Search Report and Written Opinion, Patent Cooperation Treaty, PCT application No. PCT/US2010/061979, dated Feb. 15, 2011, 11 pages.

(Continued)

*Primary Examiner* — Irete F Ehichioya
*Assistant Examiner* — Johnese T Johnson
(74) *Attorney, Agent, or Firm* — Fish & Richardson P.C.

(57) ABSTRACT

Managing queries performed on one or more data sources includes: storing at least a first query in a storage medium; selecting the first query for processing; instructing a query engine to process the first query on a first portion of data in the one or more data sources for a first query interval; receiving result data from the query engine based on processing the first query on the first portion of data; saving a state of the first query in the storage medium after the first query interval; instructing the query engine to process a second query during a second query interval after the first query interval; and instructing the query engine to process the first query on a second portion of data in the one or more data sources during a third query interval after the second query interval.

45 Claims, 11 Drawing Sheets

(56) References Cited

U.S. PATENT DOCUMENTS

2009/0083238 A1* 3/2009 Chaudhuri ........ G06F 17/30501
2011/0040796 A1* 2/2011 Shockro ........... G06F 17/30654
                                                                                                   707/794

OTHER PUBLICATIONS

Australian Examination Report, AU 2010336363, dated Apr. 30, 2015, 5 pages.
Canadian Office Action issued in application No. 2,785,398, dated Apr. 20, 2016, 8 pages.
Chinese Office Action, CN201080058553.2, dated Oct. 11, 2014 (English Translation) (6 pages).
Japanese Office Action, issued in corresponding application No. JP 2012-546227, dated Jun. 12, 2014 (English Translation).
Australian Office Action, issued in corresponding application No. 2010336363, dated May 15, 2014.

* cited by examiner

| 702 A | 704 B | 706 C | 702 A | 704 B | 706 C | 702 A | 704 B | 706 C | 702 A |

| 708 A | 710 B | 708 A | 712 C | 708 A | 710 B | 708 A | 704 B | 712 C | 708 A | 710 B | 708 A | 712 C |

| 714 A | 716 B | 718 C | 716 B | 718 C | 716 B | 718 C |

| 720 A | 722 B | 724 C | 720 A | 722 B | 724 C | 728 A | 722 B | 724 C | 728 A | 722 B | 724 C | 728 A |

726

MANAGING QUERIES

CROSS-REFERENCE TO RELATED APPLICATIONS

This application claims priority to U.S. Application Ser. No. 61/289,778, filed on Dec. 23, 2009, incorporated herein by reference.

BACKGROUND

This description relates to managing queries.

Some data storage systems (e.g., databases) store large amounts of data stored in a way that is mean to support processing a large number of queries. For example, some systems include parallel processing capabilities through the use of parallel storage devices, parallel query processing engines, or both.

SUMMARY

In one aspect, in general, a method for managing queries performed on one or more data sources includes: storing at least a first query in a storage medium; selecting the first query for processing; instructing a query engine to process the first query on a first portion of data in the one or more data sources for a first query interval; receiving result data from the query engine based on processing the first query on the first portion of data; saving a state of the first query in the storage medium after the first query interval; instructing the query engine to process a second query during a second query interval after the first query interval; and instructing the query engine to process the first query on a second portion of data in the one or more data sources during a third query interval after the second query interval.

Aspects can include one or more of the following features.

The method further includes: storing a priority associated with the first query in the storage medium; changing the priority associated with the first query prior to selecting the first query for processing; wherein selecting the first query for processing includes selecting the query based in part on the priority.

The first query interval is defined by a predetermined amount of time.

The priority of the first query affects how much of the data in the one or more data sources is included in the first portion of data on which the first query is executed for the first query interval.

Storing the first query includes storing a notification threshold of a quantity of result data to be available before a requester that provided the first query is notified.

The method further includes notifying the requester when the quantity of result data exceeds the notification threshold, wherein saving the state of the first query includes storing the quantity of result data received from the query engine.

The method further includes returning result data upon request from the requester; and storing the quantity of result data returned to the requester in the storage medium.

Selecting the query is based on the quantity of result data received from the query engine and the quantity of result data returned to the requester.

Saving the state of the first query includes: instructing the query engine to suspend the first query; and saving a state of the first query after the first query has been suspended.

Instructing the query engine to process the first query on the second portion of data includes: loading the saved state of the first query; and instructing the query engine to resume the first query.

Saving the state of the first query includes saving an offset into a secondary index.

The secondary index is a block compressed indexed file.

The method further includes dividing the first query into multiple subqueries, and instructing the query engine to process at least some of the subqueries concurrently.

The second query is received and stored in storage medium after the first query interval begins.

The second query is received and stored in storage medium before the first query interval begins.

In another aspect, in general, a computer-readable medium stores a computer program for managing queries performed on one or more data sources. The computer program includes instructions for causing a computer to: store at least a first query in a storage medium; select the first query for processing; instruct a query engine to process the first query on a first portion of data in the one or more data sources for a first query interval; receive result data from the query engine based on processing the first query on the first portion of data; save a state of the first query in the storage medium after the first query interval; instruct the query engine to process a second query during a second query interval after the first query interval; and instruct the query engine to process the first query on a second portion of data in the one or more data sources during a third query interval after the second query interval.

In another aspect, in general, a system for managing queries performed on one or more data sources. The system includes a storage medium storing at least a first query. The system includes a query engine configured to process queries on data in the one or more data sources. The system also includes a server configured to: select the first query for processing; instruct the query engine to process the first query on a first portion of data in the one or more data sources for a first query interval; receive result data from the query engine based on processing the first query on the first portion of data; save a state of the first query in the storage medium after the first query interval; instruct the query engine to process a second query during a second query interval after the first query interval; and instruct the query engine to process the first query on a second portion of data in the one or more data sources during a third query interval after the second query interval.

In another aspect, in general, a system for managing queries performed on one or more data sources. The system includes a storage medium storing at least a first query. The system includes a query engine configured to process queries on data in the one or more data sources. The system includes means for managing queries in the storage medium, the managing including: instructing the query engine to process the first query on a first portion of data in the one or more data sources for a first query interval; receiving result data from the query engine based on processing the first query on the first portion of data; saving the first query in the storage medium after the first query interval; instructing the query engine to process a second query during a second query interval after the first query interval; and instructing the query engine to process the first query on a second portion of data in the one or more data sources during a third query interval after the second query interval.

Aspects can include one or more of the following advantages.

Selecting queries based in part on the priority associated with the queries can enable efficient processing in a parallel query processing system. Slicing time into intervals in which portions of queries can be partially processed and then suspended allows some queries to be processed sooner and reduces some potential backlog in the system, in particular for high priority queries.

Other features and advantages of the invention will become apparent from the following description, and from the claims.

DESCRIPTION

1 Overview

Figure 1:
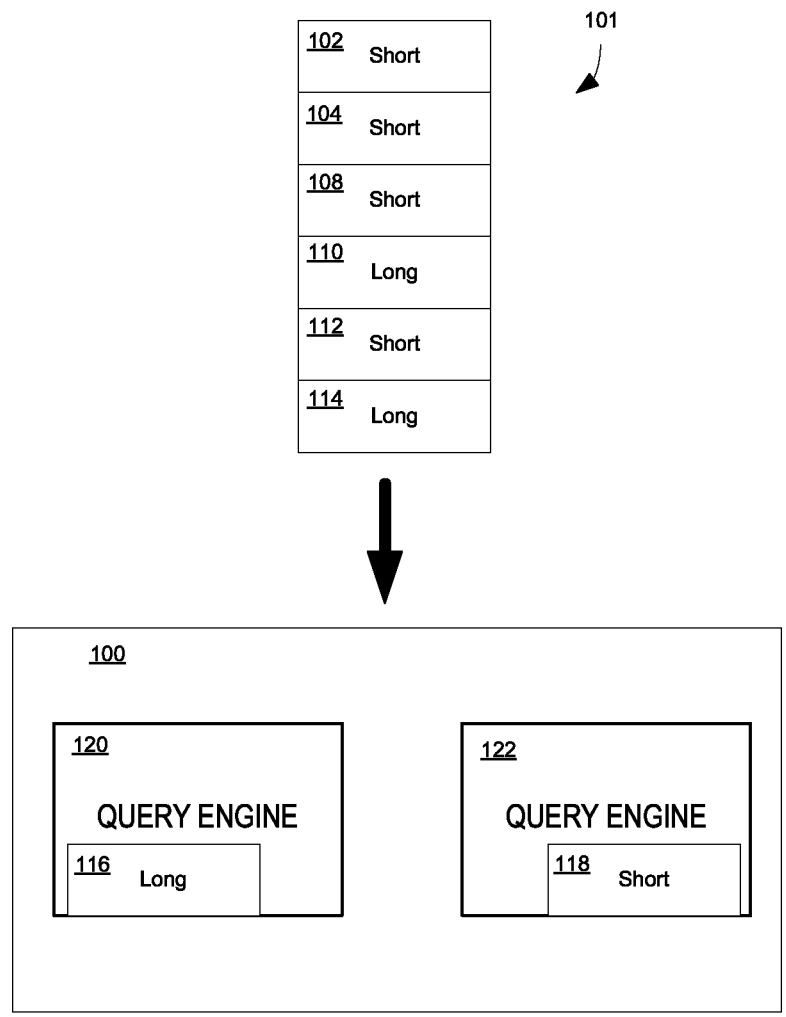
FIGS. 1 and 2 are schematic diagrams depicting query processing.
Figure 2:
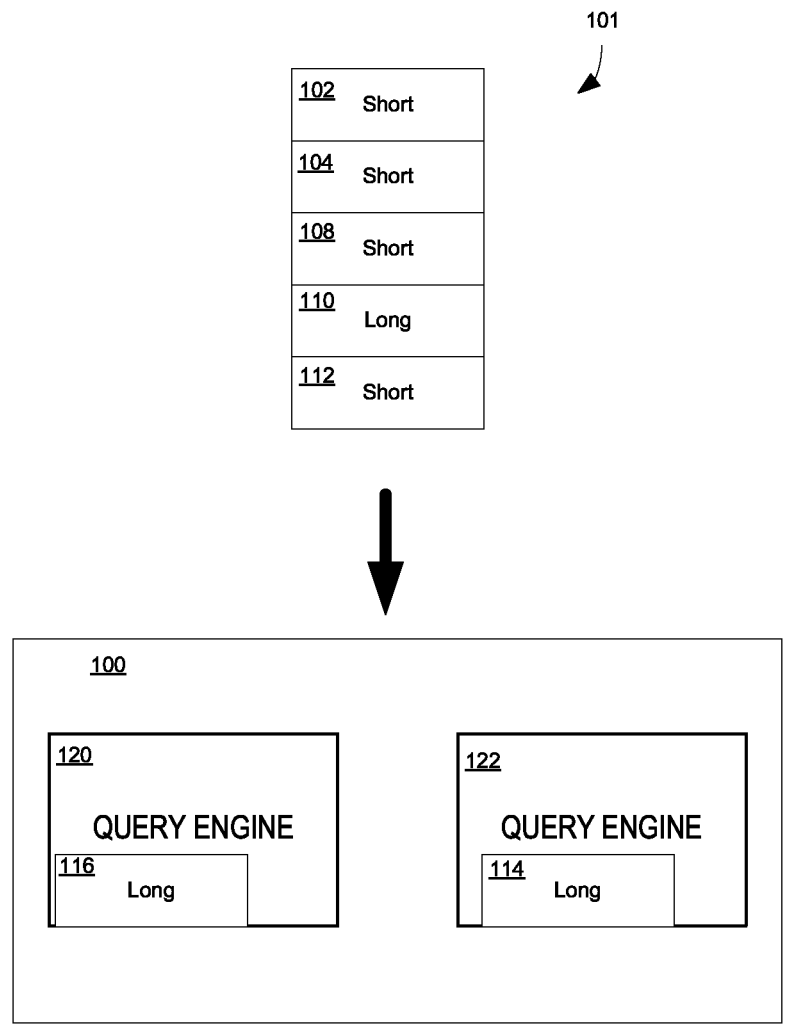

Referring to FIG. 1, several problems may arise in distributed query management. For example when queries are delivered to a query engine of a data storage system in a first in first out manner the system may become backlogged. In some cases, queries delivered may include short queries 102, 104, 108, 112, 118 which execute quickly with little need for resources, longer queries 110, 114, 116 which require a longer time to execute and utilize a great deal of system resources, and queries which fall somewhere in between short queries and long queries. It may not be practical to predetermine the amount of system resources a particular query will require before the query is executed. FIG. 1 shows an example of a system for processing queries using multiple query engines. Queries are asynchronously received and stored in a queue 101 waiting for an opportunity to be processed by a query engine executing on a query server 100 of a data storage system. In this example, initially a long query 116 is assigned to a first query engine 120 for processing and a short query 118 is assigned to a second query engine 122 for processing. Referring to FIG. 2, a short time later the short query 118 may have been completed and the next query in line, a long query 114 is assigned to the free query engine 122. At this point the remaining queries 102, 104, 108, 110, 112 wait until one of the long queries 116, 114 completes processing and frees up processing resources in a query engine. This phenomenon increases the latency of shorter queries and may cause an unacceptable delay in queries for which a quick reply is expected.

Figure 3:
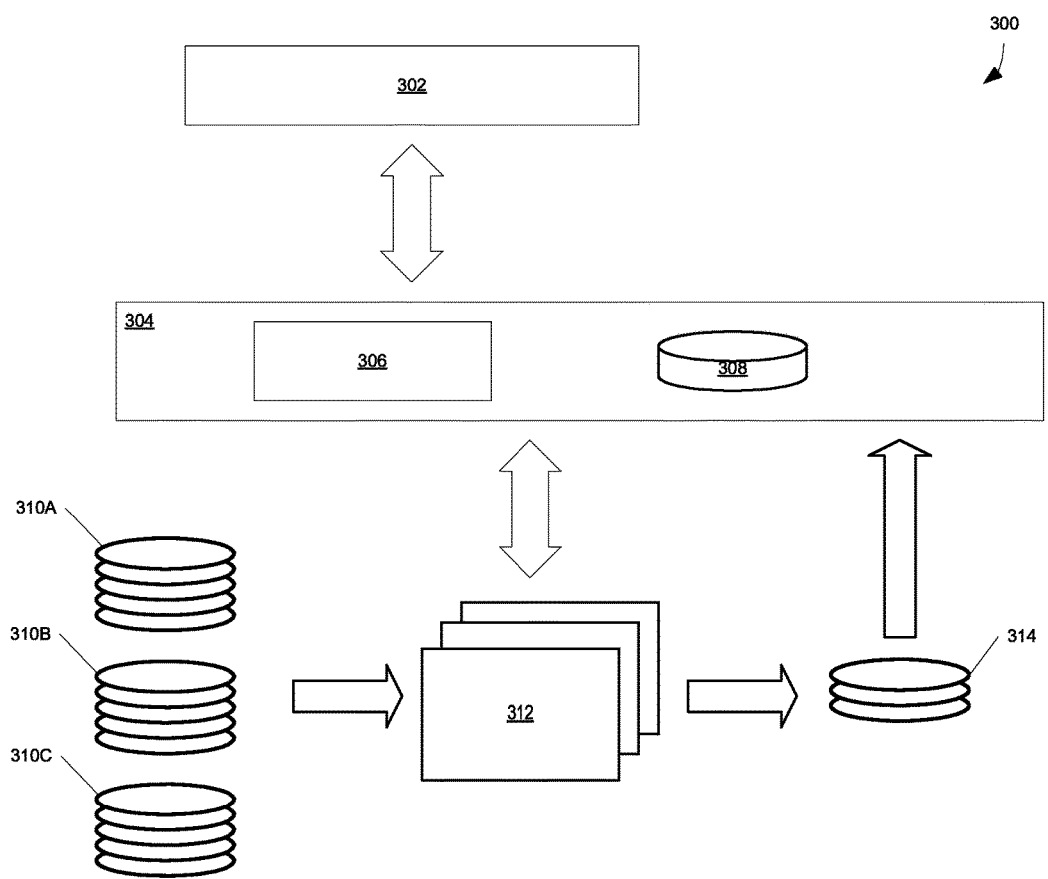
FIG. 3 is a block diagram of a data storage system.

Referring to FIG. 3, a data storage system 300 is configured to provide a front-end service 302, for example, a web service, to receive a request to execute a query. A mediation server 304 schedules query execution by multiple query engines 312. Each query is permitted to execute for an allotted period, the period may be measured by time (e.g., as measured by the CPU clock), duration, numbers of rows processed, or number or rows retrieved, for example. The query engines 312 access data from one or more data sources 310A, 310B, 310C to process the query to produce a result set 314. Storage devices providing the data sources may be local to the system 300, for example, being stored on a storage medium connected to a computer implementing the mediation server 304 (e.g., a hard drive), or may be remote to the mediation server 304, for example, being hosted on a remote system (e.g., a mainframe) in communication over a remote connection.

The mediation server 304 manages the result set 314. The mediation server 304 may store additional information about the query, for example, a priority of the query, the number of rows requested, the number of rows returned from the query, the number of rows returned to the requester, an indication of how the query is going to be used, how many rows are required at a time, the last time the query executed by a query engine, and a status indicator. The status indicator may indicate that the query is waiting, running, suspended, interrupted, or complete. In some arrangements, the query state may also indicate the presence of an error condition which occurred during query processing. Queries in the waiting state are eligible for execution but not currently running. Queries in the running state are currently being processed by the query engine. Queries in the suspended state are not eligible for execution because the mediation server has already returned the number of rows currently requested by a client. Queries in the interrupted state are not eligible for execution because they have been preempted by a higher priority query. Queries in the completed state have completed execution. In some arrangements, additional statuses are supported.

The mediation server 304 may also store information identifying when and how the requester should be notified that query results are ready for processing. In some arrangements, multiple query engines may independently operate on different portions of a single query. Each query engine independently updates the mediation database. A notification event will be triggered once when the triggering event occurs, for example, when the combined query engines have returned a requested number of rows.

In some implementations, mediation server includes a mediation logic module 306 and a mediation database 308. In some implementations, the mediation logic module 306 may be incorporated into the individual query engines 312, a front-end service 302, or divided between multiple services. The query engines 312 may update the mediation database 308 as to the number of rows available in the result set 314.

Figure 4:
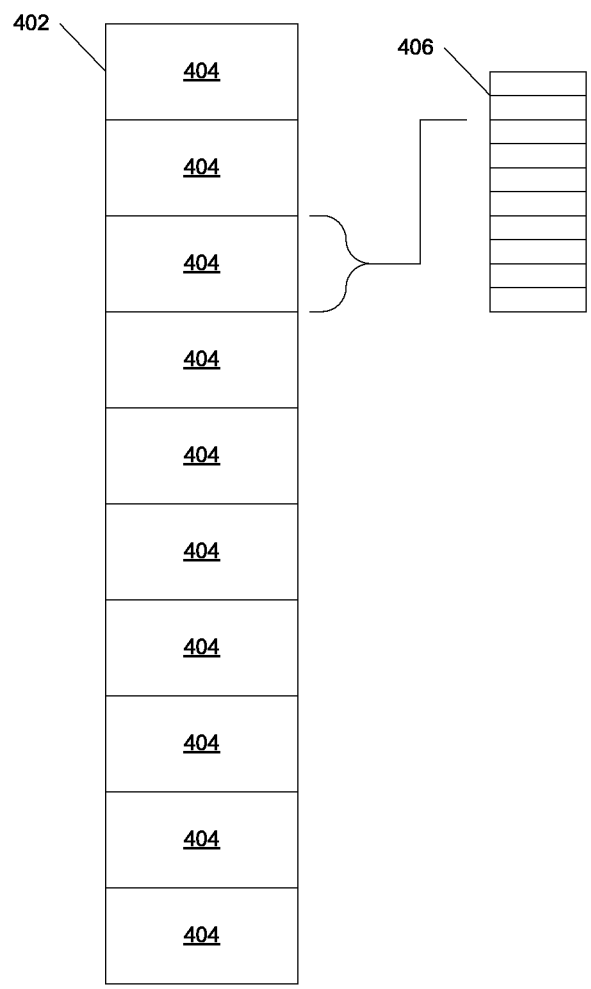
FIG. 4 is a schematic diagram of an indexed compressed data storage.

In some implementations, the data sources 310 include, referring to FIG. 4, indexed compressed data storage 402. An indexed compressed data storage includes multiple compressed data blocks 404 stored, for example, in a file. Each compressed data block is associated with at least one index 406 that enables location of data within that compressed data block. In some implementations, a primary index is provided that can be searched based on a first key (e.g., a primary key), and one or more secondary indexes are provided that can be searched based on other keys (e.g., a foreign key). Some of the indexes may be made up of a surrogate key where each key value is unique, other indexes based on a natural key where the values of the key may not be unique within the data set. In some implementations, the natural indexes may be combined to create a single consolidated index. Indexed compressed data storage techniques and systems are described in more detail in U.S. Patent Application Publication No. 2008/0104149 A1, incorporated herein by reference.

2 Query Slicing

Figure 5A:
FIGS. 5A-5B, 6A-6B and 7A-7D are plots showing intervals of time associated with processing queries.

Referring to FIG. 5A, a series of queries A 502, B 504, C 506, and D 508 are shown in a plot showing intervals of time associated with different queries. If the queries are executed in the order in which they are delivered, query A is executed to completion over interval 502, then query B is executed to completion over interval 504, followed by queries C over interval 506 and D over interval 508. Under these conditions, query A would not return results until it completes at time 510, query B would not return results until it completes at time 512, query C would not return results until it completes at time 514, and query D would not return results until it completes at time 516. Although query D is a short query, it takes a long time to return any results because it happened to be situated behind other longer queries.

Figure 5B:
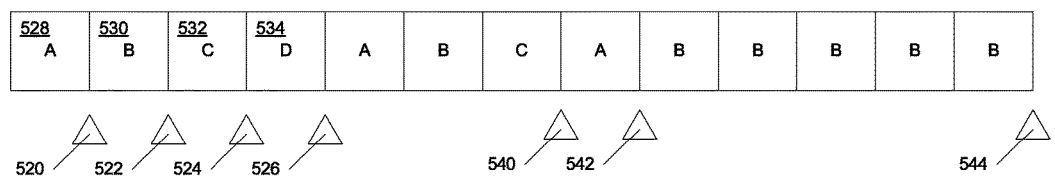

In some implementations of the mediation server 304, instead of necessarily running queries sequentially to completion, the mediation server divides a query into multiple different smaller portions. The query engine 304 is instructed to execute a query for a particular interval. This interval may be defined by a period of time, a number of rows to be returned, the number of rows processed, or based on some other criteria. Using this approach, referring to FIG. 5B, query A runs for an interval 528, query B runs for an interval 530, query C runs for an interval 532, query D runs for an interval 534 (to completion), and then query A runs again for a second interval. In some cases, some results from a query may be returned to the process which submitted the query after each interval in which the query is processed. For example, some results from query A may be return after the time 520, and some results from queries B, C, and D may be return after the times 522, 524, 526, respectively. By dividing the queries into small execution intervals the system 300 can generate some results for more queries sooner than if the system had to wait for queries to complete before executing other queries. Additionally, some queries can be completed sooner than they would have been completed otherwise, with the trade-off of delaying other queries. In this example, query D is completed at time 526, query C is completed at time 540, query A is completed at time 542, and query B is completed at time 544. So in this example, the shorter queries C and D are completed sooner at the expense of delaying the longer queries A and B.

The determination of how to divide a query may depend on the operational characteristics desired for the system. For example, providing dividing a query based on time may guarantee that each query is allowed to do a specific amount of work, but there is no guarantee how long the work may take in calendar time nor is there a guarantee as to how many rows may be returned in an execution interval. In contrast, allowing a query to execute until a number of rows are returned determines how many execution intervals will be necessary to generate a number of results, but without a guarantee as to how long an interval may last. Allowing a query to run until a number of rows have been processed may allow the system to identify how many execution intervals will be necessary to complete a query but will not tell how many cycles are required to return a specific number of rows or specifically how long a particular execution cycle will take.

Time for processing queries can be divided into execution intervals (or "query intervals") even if only a single query is being processed. At the end of a query interval, if a new query has arrived, then the query being processed is suspended and the next query interval is used to process the new query. Alternatively, if a new query has not arrived at the end of the query interval, then the query being processed can continue to be processed for an additional query interval. For example, in the example of FIG. 6A query B arrives at time 610 during the processing of query A, and in the example of FIG. 6B both queries A and B arrive before processing of either query A or query B has begun.

Figure 6A:
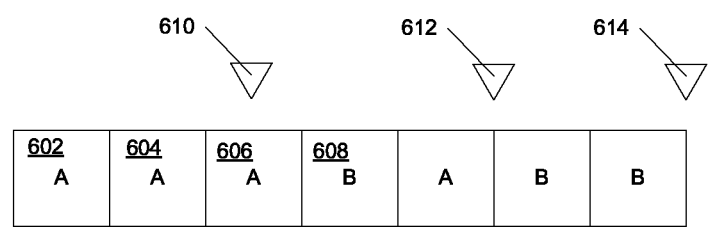
Figure 6B:
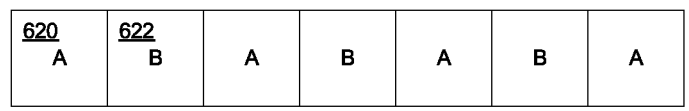

In the example of FIG. 6A, query A runs for an interval 602 and if query A has not completed at the end of the interval 602, the system checks to determine whether query A should be processed for an additional query interval or whether there is another query waiting to be processed. Since query B has not yet arrived at the end of interval 602, query A is processed during query interval 604. Similarly, query A is also processed during the following query interval 606. However, at the end of query interval 606, the system determines that the query B, which arrived at time 610, should be processed during interval 608. Queries A and B are then processed in alternating intervals until each is completed (in this example, query A is completed at time 612 and query B is completed at time 614). In the example of FIG. 6B, query A runs for an interval 620 and if query A has not completed at the end of the interval 620, the system checks to determine whether query A should be processed for an additional query interval or whether there is another query waiting to be processed. Since query B has arrived before the end of interval 620, query B is processed during query interval 622. Queries A and B are then processed in alternating intervals until each is completed.

Suspending a query at the end of a query interval includes saving the state of the query in the mediation database. In one arrangement, after an interval a query state may be updated in the mediation database to "suspended" or another state indicating the query is not eligible for execution. After a predetermined interval, the query's status may be updated to "waiting" to enable the query to run again. In other arrangements, the mediation server automatically schedules the query immediately after the predetermined interval.

3 Query Prioritization and Reprioritization

Figures 7A, 7B, 7C, 7D:
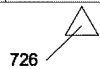

The mediation database may store a priority associated with individual queries. The priority may affect the frequency and manner in which a query is run. Referring to FIG. 7A, a high priority query A may be provided with larger execution intervals 702 than a query B (processed during intervals 704) or a low priority query C (processed during intervals 706). In this example, the high priority query A is provided larger execution intervals 702 than the execution intervals 704 provided to the query B, and the query B is provided with execution intervals 704 larger than the execution intervals 706 provided to the low priority query C. Alternatively, referring to FIG. 7B, a high priority query A may be provided with more frequent execution intervals 708 than a standard priority query B (processed during intervals 710), and the standard priority query B may be provided with more frequent execution intervals than a low priority query C (processed during intervals 712). Referring to FIG. 7C, In some circumstances a query A may be provided a priority high enough that processing of other queries B and C is suspended until the query A completes execution (after interval 714) at which point execution on the suspended queries B and C resumes, alternating between intervals 716 and 718, respectively.

The mediation database also allows queries to reprioritize while the query executes. For example, referring to FIG. 7D, high priority query A is scheduled by the mediation database (during intervals 720) along with normal priority query B (during intervals 722) and low priority query C (during intervals 724). At a time 726 high priority query A is reprioritized to a normal priority level. At which point the mediation database adjusts the scheduling of queries based on the new prioritization. Going forward after reprioritization, now normal priority query A is provided with execution intervals 728 of similar size to the intervals 722 provided to normal priority query B.

The reprioritization may occur due to a determination made by the requesting process or may occur within the mediation server based on its own criteria. For example, the mediation server may be provided a deadline to complete a query, as the deadline approaches the server may boost the priority of the query to ensure timely completion. In some cases, a query may be provided with multiple smaller execution intervals, instead of a single larger execution interval in order to allow the mediation server to check for higher priority traffic. In other cases, the mediation server may be able to interrupt the execution interval of a running query to allow a higher priority query to execute.

In some cases, queries may be scheduled ahead of execution either before or during the execution of a previous query, with the new query entering in the next interval. In some cases, the next query to be scheduled for execution may be selected just before execution based on a selection criteria.

4 Parallel Query Processing

For many systems, it may be advantageous to execute multiple queries at once. For example, two queries running on a single system may experience improved performance over a single query running on a system. This may occur, for example, because one query may be utilizing one computing resource while the second query is utilizing a different resource. By running both queries at once throughput is improved. In some implementations, referring to FIG. 8, a high priority query 802 is divided into query slices 804, 806, 808, 810, 812. Each slice may be processed by a separate query engine 814, 816, 818, 820, 822.

Figure 9:
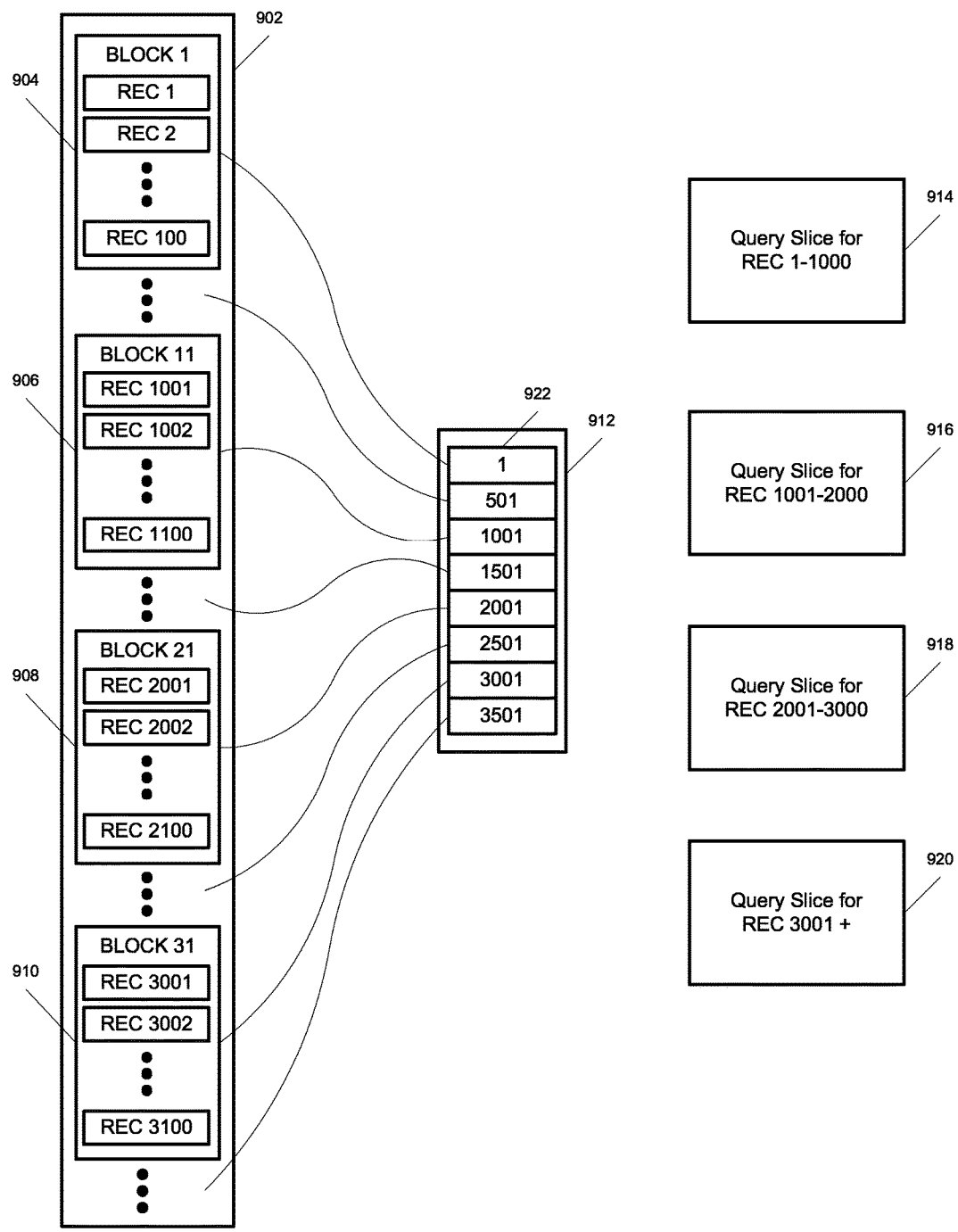
FIG. 9 is a schematic diagram showing query processing of an indexed compressed data storage.

The high priority query 802 may be sliced based on a number of rows to process as described above. The partitioning information may be compared to a secondary index of an indexed compressed data storage that is the target of the query in order to determine how many execution intervals will be necessary to complete the query. This will also identify which parts of the index compressed data storage will be processed by each query slice. For example, referring to FIG. 9, an indexed compressed file 902 includes multiple data blocks 904, 906, 908, 910 each data block includes multiple data records. The indexed compressed file 902 is associated with an index 912 which references the data blocks. In some arrangements the index may include one index record 922 for each data block, and in other arrangements the index 912 may include fewer index records 922 than data blocks. In some arrangements each index record 922 references a data block 904, 906, 908, 910, and in other arrangements each index record 922 references the first data record of a data block. The mediation server reviews the index 912 and determines query execution intervals (or "query slices") based on the index records. In this example, the query engine elects to create four query slices 914, 916, 918, 920 based on the index 912. One query slice 914 processes data records starting with block 1 904 and ends with the end of block 10 (not shown), query slice 916 processes data starting with block 11 906 and ends with the end of block 20 (not shown), query slice 918 starts processing with block 21 908 and ends with the end of block 30 (not shown), and finally query slice 920 starts processing with block 31 910 and ends processing at the end of the indexed compressed file 902. In this example, the mediation server may elect to create any number of query slices, limited only by the number of index records 922 in the index 912.

Figure 8:
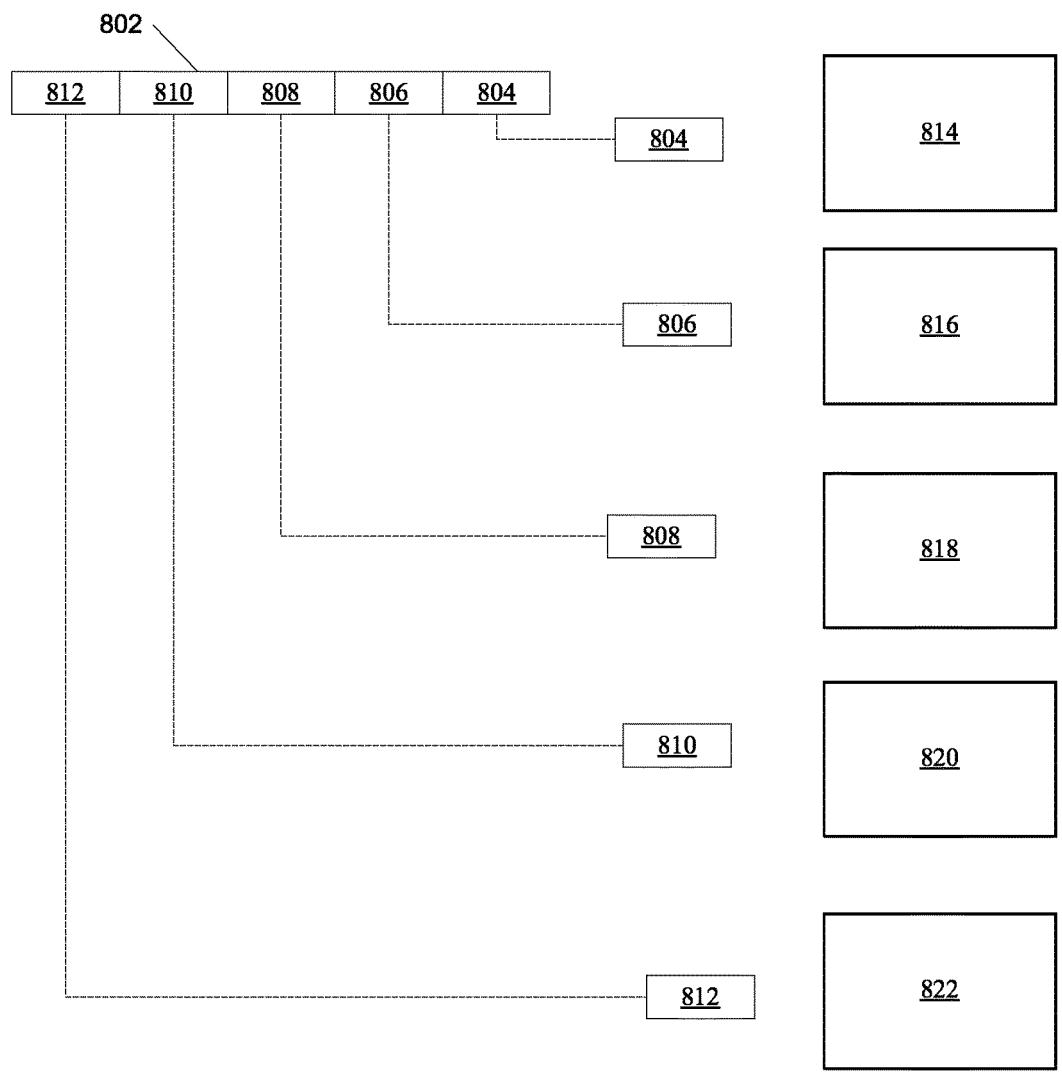
FIG. 8 is a schematic diagram of sliced query processing.

Referring to FIG. 8, each slice of the query may be simultaneously processed by a different one of the query engines 814, 816, 818, 820, 822. For example, query slice 804 may be processed by a query engine 814 while query slice 806 is substantially simultaneously processed by query engine 816. At the same time query slice 808 is processed by query engine 818; query slice 810, by query engine 820; and query slice 812, by query engine 822. Each query engine produces a result set for their query partition. Once all of the result sets are generated, the result sets may be combined together to form the complete result set for the entire query. Using this method, a high priority query can be completed in a fraction of the time it would normally take to complete the operation.

5 Callbacks

The system provides notification when a trigger defined by pre-designated criterion is met. Referring to FIG. 3, when a new query is submitted to the front-end service 302, the submission may include information requesting the mediation server 304 notify the requester (via the front-end service 302) when a condition is met. In some arrangements, the condition may be a notification when a particular number of result data elements are ready to be accessed by the requester. For example, a requester may be notified when one hundred result records are ready. In some cases, the requester may designate the number of result data elements that should be ready before notification. In other cases, the requester may provide other criteria which must be met before the requester is notified. For example, a requester may wish to be notified when the query is suspended or when all processing is complete. In some cases, the trigger criteria may be limited to state information tracked in the mediation database 308. In other cases, the trigger criteria may be unlimited. The trigger may be provided to the mediation server 304 in a number of different ways. For example, the trigger may be provided as a script which the mediation server 304 executes after each query interval or a compiled class complying with a predetermined application programming interface (API). In some cases, the condition may occur only once, for example, a condition that one hundred result records had been discovered. In other arrangements the condition may be reoccurring, for example, a request for notification each time one hundred additional result records are discovered.

In some cases, the submission of the trigger condition may also include an action definition. This action may be stored in the mediation database 308 along with the trigger. The action defines how the mediation server 304 responds when the condition is met. The action may be one of a predetermined set of possible actions, for example, notify, summarize, etc. The action may be a script that is executed on the mediation server 304. For example, one action may submit additional queries to the system using the returned results as a query parameter. The action may be provided as a compiled class which conforms to a pre-established API.

6 Query Suspension

In some implementations, the mediation server 304 is capable of suspending the processing of a query. The mediation server may mark the query as suspended and no processing will occur until the query is resumed. Along with suspending the query the query server may save a state of the query. This state is an indication of the process of the query. For example, the state may be an offset to an indexed compressed data store, or the state may include the last processed node in a b-tree.

In some cases, the mediation server may elect to suspend a query on its own initiative. This may occur, for example, when a query has produced a number of records in a result set and the number of rows in the result set waiting to be delivered to the requester exceeds a threshold.

For example, a requester who submits a query may later request the delivery of a fixed number of rows, for example, if a user interface may require a "page" of twenty-five rows of data to populate the screen the system may request twenty-five rows of data from the query. Later, if a user indicates that he wishes to see more query results the system may request the next "page" of query results, or results twenty-six to fifty. The mediation database tracks the number of results returned from the query and the number of results returned to the user. For example, the query may have returned 300 rows, but 25 rows may have been sent to the requester. If the number of rows returned from the query exceeds the number of rows sent to the requester by a margin (for example, 25, 50, 75, or 100 rows) then the mediation database may suspend processing of that query. This may be accomplished by either marking the query as suspended in the mediation database or via a check prior to scheduling the next execution of the query.

In some cases, the threshold may be defined by the system 300, and in other cases the threshold may be defined individually for each query depending on how the query is going to be used. For example, a query whose results are going to be used to display lists of data on Web pages with a fixed number of items display may suspend when four pages of data are waiting. In contrast, a query whose results are going to be used to create a summary report of all of the data returned by the query, for example a month's end report, may not suspend at all. In some cases, the threshold may be inferred from the number of rows to collect before notifying the requester.

In some cases, a query may be explicitly suspended by updating the query's state information in the mediation database. For example, a query may be marked as suspended to allow higher priority queries to execute. In other cases, a query may be implicitly suspended because the mediation servers scheduling algorithm is such that a query with the state of the suspended query will not be scheduled. Suspending queries has the additional advantage of minimizing the waste of resources when a query is submitted and the calling program subsequently terminates before the query is complete. The mediation server may elect to delete a query and a result set if the requester has not accessed the results for a predefined period.

7 Mediation Server Processing

Figure 10:
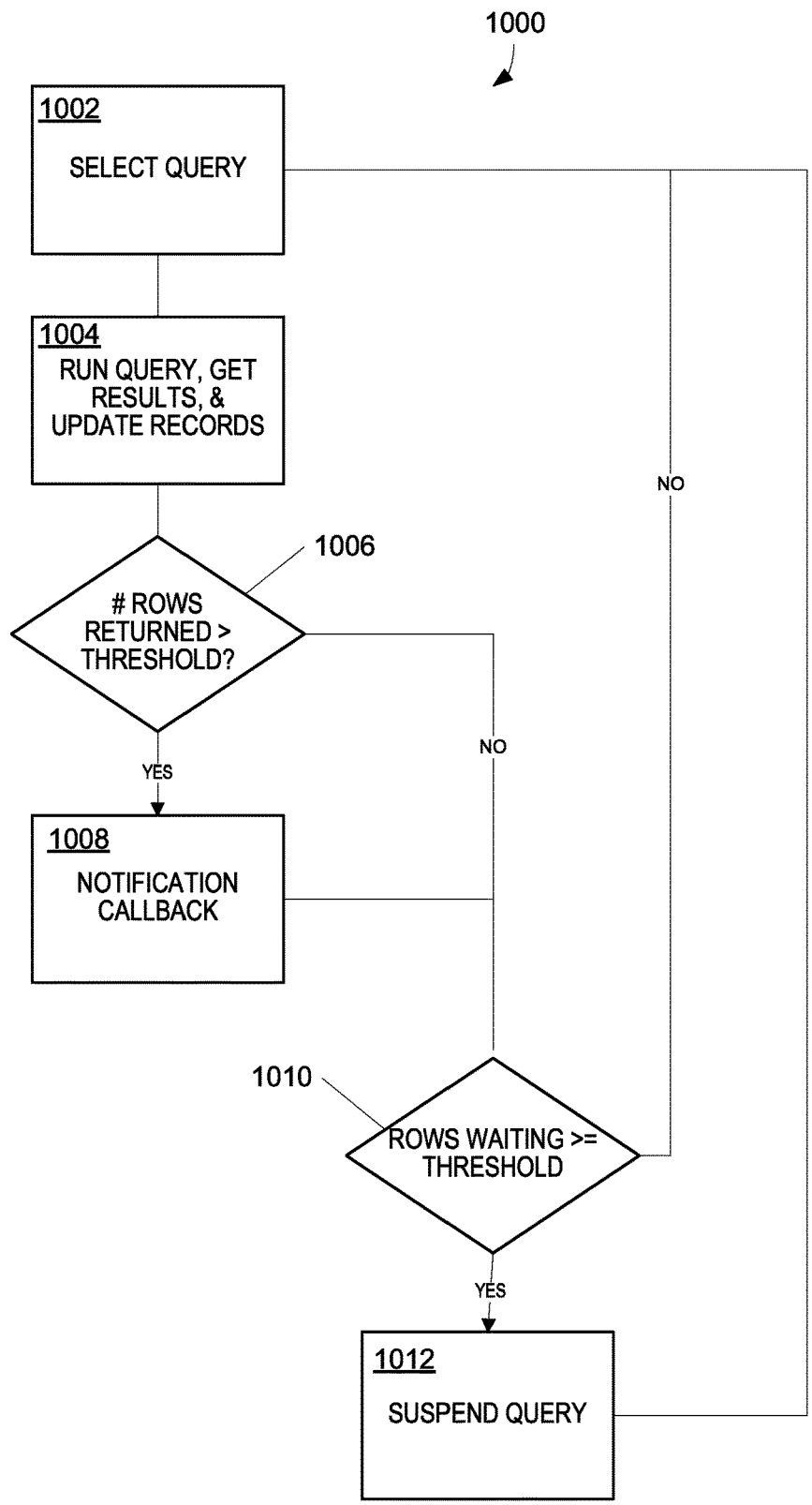
FIGS. 10 and 11 are flowcharts of processes for managing queries.

Referring to FIG. 10, a flowchart 1000 represents an exemplary arrangement of operations of the mediation server 304 including a determination as whether to suspend processing of a query without an external request.

Operations include selecting a query for execution 1002. In one example, the query may be selected as part of a pre-determined schedule established by the mediation server. In another example, the query may be selected based on some criteria which may include the priority of the query and the last time the query was run. In some arrangements, the mediation server iterates over the queries waiting execution (for example, in a waiting state). Each of the queries is schedule to run on the query engine. Once all queries which are waiting have been executed the mediation server repeats the process for the queries still waiting execution. In other arrangements, the mediation server selects the query which has been waiting for the longest interval for execution. In other arrangements, the mediation server selects the query with the highest priority for execution.

Operations also include running the query on a query engine 1004. In one example, the selected query may be assigned to a query engine which executes the query against the data records, updates a result set, and notifies the mediation server of the number of rows returned.

Operations also include a check of the number of rows waiting to be delivered 1006. If the number of rows waiting to be delivered exceeds the notification threshold then the mediation server performs a callback to the requester 1008.

Operations also include a check 1010 if the number of rows waiting for the requester to access them exceeds the suspend threshold then the query is suspended 1012. Whether the query is suspended or not, the mediation server moves on the select the next query to process.

Figure 11:
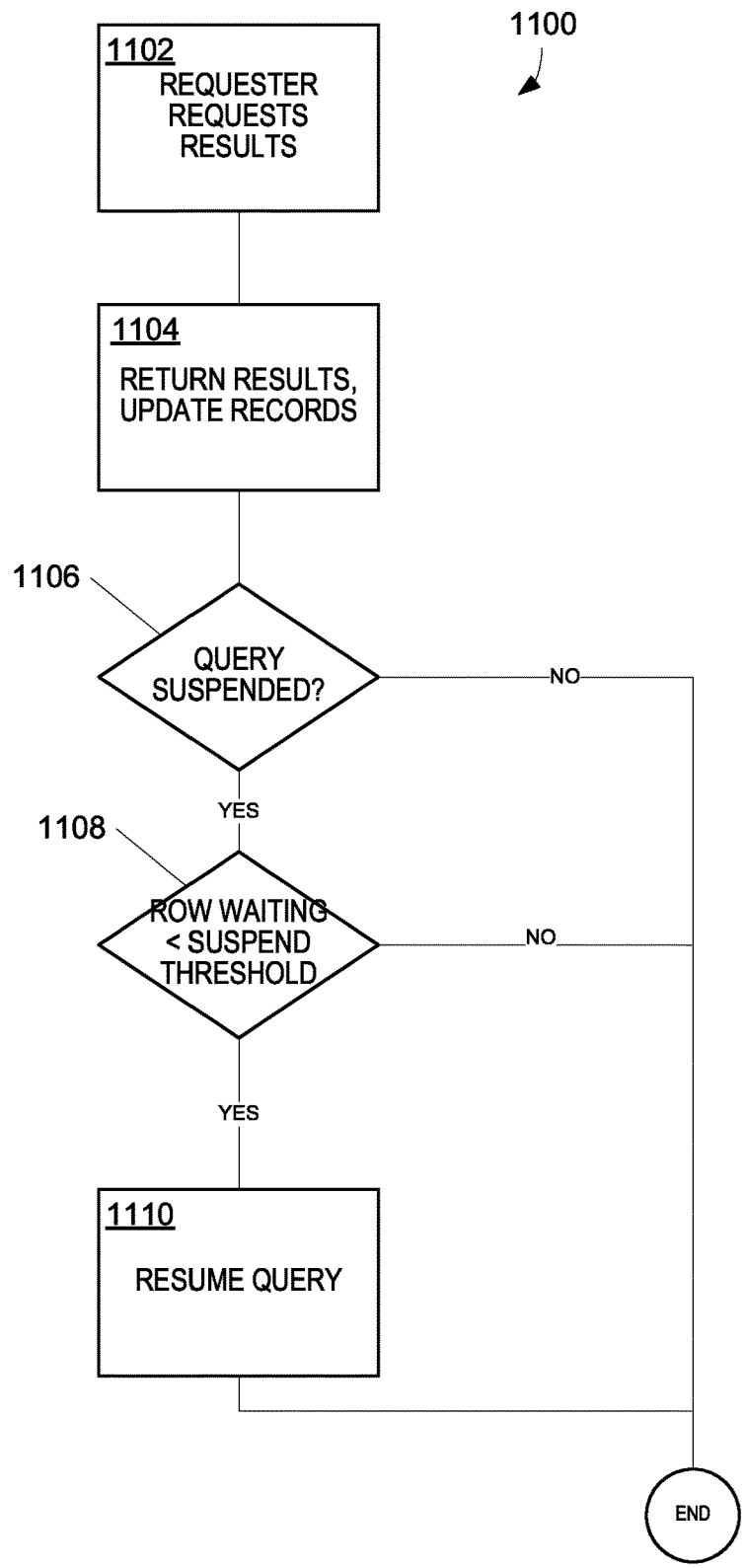

Referring to FIG. 11, a flowchart 1100 represents an exemplary arrangement of operations of the mediation server 304 in response to a requester accessing part of a result set returned by a query, for example, after a callback has notified the requester that the results are ready for access.

Operations include the requester requesting results from the query 1102. In some arrangements, the requester may send an indication of the number of rows to be returned, for example a request to return twenty-five rows. In other arrangements, the requester may request a specific range of results to be returned. For example, the requester may request results fifty to one hundred twenty six to be returned. In still other arrangements, the requester may request that all collected results be returned.

Operations also include returning results and updating records 1104. In response to the request, the mediation server may provide access to the rows requested. In some arrangements, the mediation server may also send an indication to the requester that the query is still processing additional results. In other arrangements, the mediation server may also provide an indication that additional results are available for immediate delivery.

Operations also include a check 1106 to determine if the query is currently suspended. If the query is suspended control passes to the next operation 1108. Otherwise the process is complete.

Operations also include a check 1108 to determine if the number of rows waiting for delivery is less than the suspend threshold. If so then the query is resumed 1110 and may be scheduled for processing by the mediation server.

The query management approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for managing queries performed on one or more data sources, including:
    executing by a query engine over a first query time interval a first query having a given priority for execution and that has multiple query portions, against a first portion of data in the one or more data sources;
    receiving first result data from the query engine;
    receiving a second query that has multiple query portions and processing a first priority change in accordance with the second query having a higher priority than the given priority of the first query;
    upon receiving the second query, instructing the query engine to suspend execution of the first query and save a state of processing of the first query;
    executing by a query engine over a second query time interval at least one of the multiple query portions of the second query during the second query time interval that is after the first query time interval, and continuing to execute one or more subsequent query portions of the second query until a second priority change is processed by the query engine; and
    receiving second result data from the query engine based on executing the at least one of the multiple query portions of the second query.

2. The method of claim 1, further including:
    storing the first query and the given priority associated with the first query in a storage medium; and
    changing a priority associated with the first query to the given priority prior to selecting the first query for processing;
    wherein selecting the first query for processing includes selecting the first query based in part on the given priority.

3. The method of claim 1, wherein the first query time interval is defined by a predetermined amount of time.

4. The method of claim 3, wherein the given priority of the first query affects how much of the data in the one or more data sources is included in the first portion of data on which the first query is executed for the first query time interval.

5. The method of claim 1, further including storing a notification threshold of a quantity of the first result data to be available before a requester that provided the first query is notified.

6. The method of claim 5, further including notifying the requester when the quantity of the first result data exceeds the notification threshold, and storing the quantity of the first result data received from the query engine.

7. The method of claim 6, further including returning the first result data upon request from the requester; and storing the quantity of the first result data returned to the requester in a storage medium.

8. The method of claim 7, further including selecting the first query based on the quantity of the first result data received from the query engine and the quantity of the first result data returned to the requester.

9. The method of claim 1, further including:
    instructing the query engine to suspend the first query; and
    saving a state of the first query after the first query has been suspended.

10. The method of claim 9, further including:
    loading the saved state of the first query; and
    instructing the query engine to resume the first query.

11. The method of claim 9, further including saving a state of the first query includes saving an offset into a secondary index.

12. The method of claim 11, wherein the secondary index is a block compressed indexed file.

13. The method of claim 1, further including dividing the first query into multiple subqueries, and instructing the query engine to process at least some of the subqueries concurrently.

14. The method of claim 1, wherein the second query is received and stored in a storage medium after the first query time interval begins.

15. The method of claim 1, wherein the second query is received and stored in a storage medium before the first query time interval begins.

16. A non-transitory computer-readable storage medium storing a computer program for managing queries performed on one or more data sources, the computer program including instructions for causing a computer to:
    execute by a query engine over a first query time interval a first query having a given priority for execution and that has multiple query portions, against a first portion of data in the one or more data sources;
    receive first result data from the query engine;
    receive a second query that has multiple query portions and processing a first priority change in accordance with the second query having a higher priority than the given priority of the first query;
    upon receiving the second query, instruct the query engine to suspend execution of the first query and save a state of processing of the first query;
    execute by the query engine over a second query time interval at least one of the multiple query portions of the second query during the second query time interval that is after the first query time interval, and continue to execute one or more subsequent query portions of the second query until a second priority change is processed by the query engine; and
    receive second result data from the query engine based on executing the at least one of the multiple query portions of the second query.

17. A system for managing queries performed on one or more data sources, the system including:

a storage medium configured to store at least a first query;
a query engine configured to process queries on data in the one or more data sources; and
a server configured to:
execute by the query engine over a first query time interval a first query having a given priority for execution and that has multiple query portions, against a first portion of data in the one or more data sources;
receive first result data from the query engine;
receive a second query that has multiple query portions and processing a first priority change in accordance with the second query having a higher priority than the given priority of the first query;
upon receiving the second query, instruct the query engine to suspend execution of the first query and save a state of processing of the first query;
execute by the query engine over a second query time interval at least one of the multiple query portions of the second query during the second query time interval that is after the first query time interval, and continue to execute one or more subsequent query portions of the second query until a second priority change is processed by the query engine; and
receive second result data from the query engine based on executing the at least one of the multiple query portions of the second query.

18. The non-transitory computer-readable storage medium of claim 16, the computer program further including instructions for causing the computer to:
store the first query and the given priority associated with the first query in a storage medium;
change a priority associated with the first query to the given priority prior to selecting the first query for processing; and select the first query for processing by selecting the first query based in part on the given priority.

19. The non-transitory computer-readable storage medium of claim 16, wherein the first query time interval is defined by a predetermined amount of time.

20. The non-transitory computer-readable storage medium of claim 19, wherein the given priority of the first query affects how much of the data in the one or more data sources is included in the first portion of data on which the first query is executed for the first query time interval.

21. The non-transitory computer-readable storage medium of claim 16, the computer program further including instructions for causing the computer to store a notification threshold of a quantity of the first result data to be available before a requester that provided the first query is notified.

22. The non-transitory computer-readable storage medium of claim 21, the computer program further including instructions for causing the computer to notify the requester when the quantity of the first result data exceeds the notification threshold, and store the quantity of the first result data received from the query engine.

23. The non-transitory computer-readable storage medium of claim 22, the computer program further including instructions for causing the computer to return the first result data upon request from the requester; and store the quantity of the first result data returned to the requester in a storage medium.

24. The non-transitory computer-readable storage medium of claim 23, the computer program further including instructions for causing the computer to select the first query based on the quantity of the first result data received from the query engine and the quantity of the first result data returned to the requester.

25. The non-transitory computer-readable storage medium of claim 16, the computer program further including instructions for causing the computer to:
instruct the query engine to suspend the first query; and
save a state of the first query after the first query has been suspended.

26. The non-transitory computer-readable storage medium of claim 25, the computer program further including instructions for causing the computer to
load the saved state of the first query; and
instruct the query engine to resume the first query.

27. The non-transitory computer-readable storage medium of claim 25, wherein instructions for causing the computer to save a state of the first query includes saving an offset into a secondary index.

28. The non-transitory computer-readable storage medium of claim 27, wherein the secondary index is a block compressed indexed file.

29. The non-transitory computer-readable storage medium of claim 16, the computer program further including instructions for causing the computer to divide the first query into multiple subqueries, and instruct the query engine to process at least some of the subqueries concurrently.

30. The non-transitory computer-readable storage medium of claim 16, the wherein the second query is received and stored in a storage medium after the first query time interval begins.

31. The non-transitory computer-readable storage medium of claim 16, wherein the second query is received and stored in a storage medium before the first query time interval begins.

32. The system of claim 17, wherein the storage medium is configured to store the first query and the given priority associated with the first query in the storage medium;
wherein the server is further configured to:
change a priority associated with the first query to the given priority prior to selecting the first query for processing; and
select the first query for processing by selecting the first query based in part on the given priority.

33. The system of claim 17, wherein the first query time interval is defined by a predetermined amount of time.

34. The system of claim 33, wherein the given priority of the first query affects how much of the data in the one or more data sources is included in the first portion of data on which the first query is executed for the first query time interval.

35. The system of claim 17, wherein the storage medium is configured to store a notification threshold of a quantity of the first result data to be available before a requester that provided the first query is notified.

36. The system of claim 35, wherein the server is further configured to notify the requester when the quantity of the first result data exceeds the notification threshold, and store the quantity of the first result data received from the query engine.

37. The system of claim 36, wherein the server is further configured to return the first result data upon request from the requester; and wherein the storage medium is configured to store the quantity of the first result data returned to the requester in a storage medium.

38. The system of claim 37, wherein the server is further configured to select the first query based on the quantity of the first result data received from the query engine and the quantity of the first result data returned to the requester.

39. The system of claim 17, wherein the server is further configured to instruct the query engine to suspend the first query; and
    save a state of the first query after the first query has been suspended.

40. The system of claim 39, wherein the server is further configured to:
    load the saved state of the first query; and
    instruct the query engine to resume the first query.

41. The system of claim 39, wherein the storage medium is further configured to save a state of the first query by being configured to save an offset into a secondary index.

42. The system of claim 41, wherein the secondary index is a block compressed indexed file.

43. The system of claim 17, wherein the server is further configured to divide the first query into multiple subqueries, and instruct the query engine to process at least some of the subqueries concurrently.

44. The system of claim 17, the wherein the second query is received and stored in the storage medium after the first query time interval begins.

45. The system of claim 17, wherein the second query is received and stored in the storage medium before the first query time interval begins.

\* \* \* \* \*

UNITED STATES PATENT AND TRADEMARK OFFICE
CERTIFICATE OF CORRECTION

PATENT NO. : 10,459,915 B2
APPLICATION NO. : 12/977594
DATED : October 29, 2019
INVENTOR(S) : Craig W. Stanfill and John MacLean Page 1 of 1

It is certified that error appears in the above-identified patent and that said Letters Patent is hereby corrected as shown below:

In the Claims

Column 14, Line 29, Claim 30, after "claim 16,", delete "the"

Column 15, Line 21, Claim 44, after "claim 17,", delete "the"

Signed and Sealed this
Fourteenth Day of January, 2020

Andrei Iancu
*Director of the United States Patent and Trademark Office*